March 10, 1953    H. PORTER    2,630,897
SPRING-FINGER DIAPHRAGM CLUTCH
Filed Oct. 1, 1951
FIG. 1.  FIG. 2.  FIG. 3.
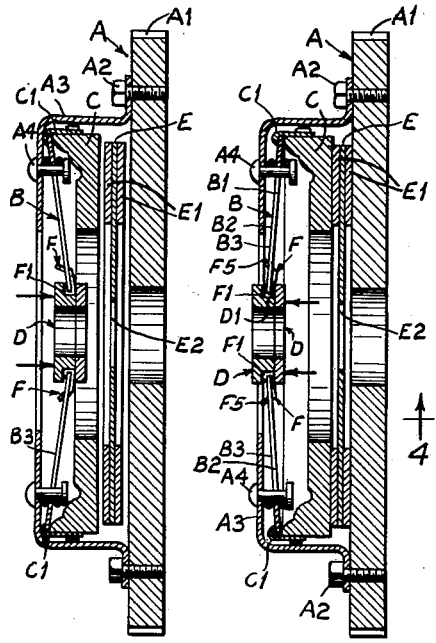
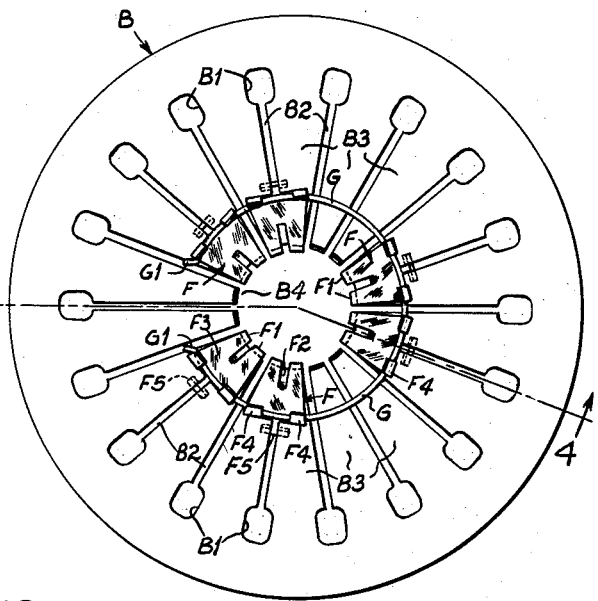
FIG. 6.  FIG. 4.
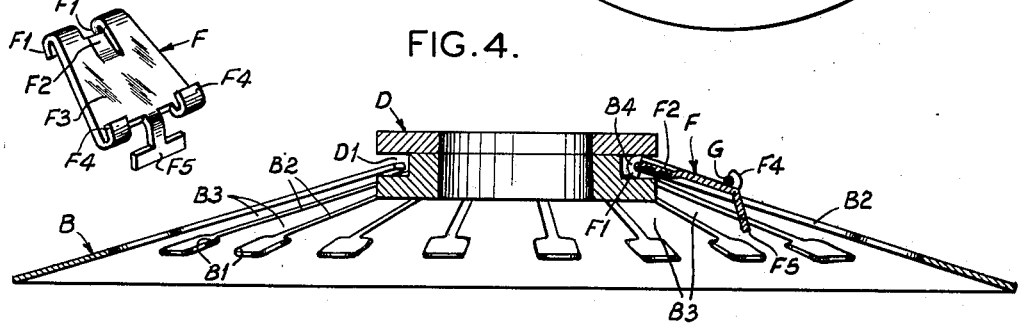
FIG. 5.
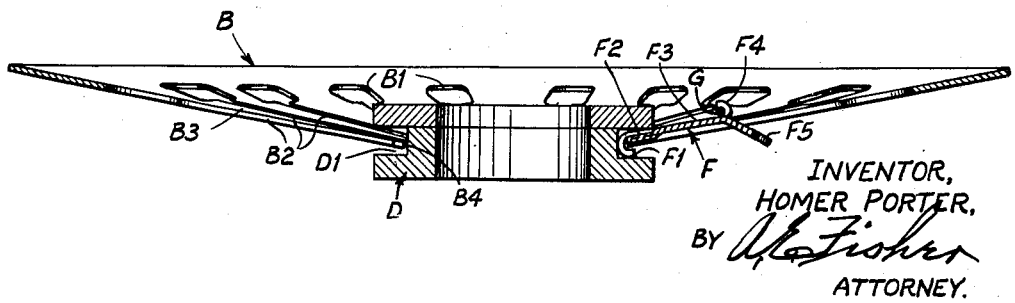
INVENTOR,
HOMER PORTER,
BY *U. E. Fisher*
ATTORNEY.

Patented Mar. 10, 1953

2,630,897

UNITED STATES PATENT OFFICE 2,630,897

SPRING-FINGER DIAPHRAGM CLUTCH

Homer Porter, San Diego, Calif.

Application October 1, 1951, Serial No. 249,027

4 Claims. (Cl. 192—89)

This invention relates to clutch improvements and more particularly to improvements in the operation of a spring-finger diaphragm clutch of the manually-operable type.

It is highly desirable in clutches, especially those on automobiles that they translate the flow of power from the driving or engine shaft to the driven or transmission shaft, upon closing of the clutch, with a smooth and gradual action, as contrasted with an uncontrolled and jerky action.

Some spring-finger diaphragm clutches have been found to be uncontrollable and jerky in the latter phases of the closing action of the clutch, due mostly to the inherent snap-acting feature which characterizes a diaphragm type clutch.

The spring-fingers must be of sufficient strength to reverse the direction of pressure when they are manually inverted (upon release of the clutch pedal) so as to press together the plates of the clutch to transmit power, but it has been found that only a carefully regulated action on the part of the operator can prevent the spring-fingers of the plates from snapping too quickly to a closed position, causing an initial surge of power through the clutch and resulting in a jerky start of the power flow.

I have found that by inserting wedges or shims at the free ends of a portion of the number of spring-fingers, in such a position as to partially move these fingers in the direction they are to move (either to open or close the clutch) that the total effort to move the whole number of fingers of the diaphragm is extended and spread out, resulting in a more gradual action of the clutch.

This lengthening or smoothing out action resulting from the insertion of wedges or shims on a part of the total number of spring-fingers, which in turn results in a smoother and less jerky action in closing the clutch, is one of the objects of this invention.

Other objects will be in part obvious and in part pointed out hereinafter.

The invention accordingly comprises the elements and combination of elements, features of construction and arrangement of parts which will be exemplified in the structures hereinafter described and the scope of the application of which will be indicated in the appended claims.

In the accompanying drawings in which is illustrated one of various possible embodiments of the invention:

Fig. 1 is a cross section of a spring-finger diaphragm clutch in open or neutral position.

Fig. 2 is a view similar to Fig. 1, showing the clutch in closed or let out position.

Fig. 3 is a plan view of the spring-finger diaphragm plate removed from the clutch and with my improvement mounted thereon.

Fig. 4 is a section on the line 4—4 of Fig. 3, showing the diaphragm spring in unsprung or rest position corresponding to the position shown in Fig. 2.

Fig. 5 is a similar section to Fig. 4, but showing the diaphragm spring in an inverted position corresponding to the position shown in Fig. 1. Fig. 6 is a perspective view of one of the shims.

Similar reference numerals or characters indicate corresponding parts throughout the several views of the drawing.

In describing my invention reference is first directed to Figs. 1 and 2 showing the clutch in an inoperative or open position (Fig. 1) and in a closed or driving position (Fig. 2).

In these views A represents a cross-section through an engine flywheel driven from an engine crank shaft not shown, and having gear teeth A1, surrounding its periphery for the usual starter gear connection.

Supported on this flywheel gear by bolts A2 is a housing A3 for containing and driving the diaphragm spring B. This driving is accomplished through the loosely held rivets A4 in the housing A3, which also extend through enlarged driving slots B1 in the diaphragm B. These slots B are at the outer ends of narrower slots B2 which define each side of the spring-fingers B3. There are eighteen spring-fingers provided in the present showing which is typical of the number used in diaphragm plates in common usage.

The outer edge or periphery of the diaphragm plate is loosely and movably held at several points by clips C1 to a circular pressure plate C. At the inner ends of the spring-fingers B3, which terminate short of the center of the diaphragm plate there is a hole B4 of sufficient diameter to accommodate the clutch ring or bearing D, the same having a groove D1 into which the inner ends of the spring-fingers ride. The bearing D is also provided with an additional groove and pivoted fork (not shown) for moving the clutch bearing D in and out along the longitudinal axis of the clutch assembly.

Between the pressure plate C and the flywheel gear A is located the clutch plate E to be driven. It is shown in Figs. 1 and 2 with the usual clutch plate facings E1 for frictional engagement with the smooth inner face of the pressure plate C and the likewise smooth face of the flywheel gear A. The clutch plate E is also provided with a splined hole E2 at its center for connection to the usual transmission shaft (not shown) which is to be driven by the engine flywheel A.

All of the foregoing parts or elements are common and are combined and work in the usual manner. That is, any longitudinal movement of the clutch ring or collar bearing D, as by manually operating the clutch fork will cause the inner ends of the spring-fingers B3 to pivot the cone shaped diaphragm plate on the rivets A4, and through the clip connection to the pressure plate C, cause the outer periphery of the plate B to move the pressure plate in and out longitudinally (see the pressure arrows, Figs. 1 and 2). This movement of the pressure plate either loosens or binds the clutch disc E between the pressure plate and the flywheel.

The rivets A4 are the fulcrum points for the spring-fingers B3 which act as levers to move the pressure plate C. It is understood that the usual action of this type clutch is that the diaphragm B springs with a snap-action from one side of a vertical center line to the other side, or that the operating or inner ends of the spring-fingers assume a position either to one side or the other of a vertical center line through the diaphragm plate.

Referring now to Figs. 3 and 6, which illustrate the wedges or shims, I use to accomplish the fore-mentioned objects of the invention, it will be seen in Fig. 6 that the shim consists of a stamped metal element F provided with a pair of downwardly turned hooks F1 separated by a depressed portion F2 of the body F3. At the other edge of the body F3 is a pair of oppositely turned hooks from that of the hooks F1. These hooks F4 are at each corner of the body F3 and between them is a downwardly extending T-shaped hook F5. The pair of hooks F1 and the single T-shaped hook F5 are bent downwardly from the body F3, while the pair of hooks F4 are bent upwardly.

In use several of the shims F are attached by feeding the T-shaped hook F5 into the narrow slots B2 between the spring-fingers B3 and moving them back until the hooks F1 rest over the ends of the spring-fingers while the depressed portion F2 of the body F3 locates the shim properly on the two adjacent spring ends.

After several shims have been placed, in this case, as shown in Fig. 3, six shims having been put over twelve spring ends, an open ended circular wire spring G is located in the upturned hooks F4, of all the shims F. The ends G1 of the open ended spring are bent back at an angle to the rest of the spring to prevent it rotating. This spring G exerts pressure on the outer ends of all the shims F to hold them in place while assembling the clutch collar within the hole B4. The T-shaped hooks F5 located in the slots B2 with the head part of the T on the other side of the diaphragm plate B prevent the shims from moving away too far from the plate B under centrifugal action when the clutch is rotating at a high speed.

From an inspection of Figs. 4 and 5 it will be clear that as the clutch collar D is moved (downwardly in Fig. 4) that the spring-fingers on the right side of the figure will move first, having already been depressed slightly from their normal position by the additional thickness of the metal in the shim F, and that then the clutch collar will pick up and move the fingers on the left side of the figure. Likewise in Fig. 5 the grooved in clutch collar which is always in loose contact with the shims F will move first the fingers at the right of Figure 5 and then pick up and move the remaining fingers at the left side of the figure.

It will be seen then, that by providing means whereby only a portion of the spring-fingers B3 are first moved and then subsequently the remainder are moved, the action of inverting the cone shape of the diaphragm from one side of its center to the other side is lengthened or extended into successive steps resulting in a gradual movement or clutch action instead of a quick snap-action; all of which applies and results in a smooth and constantly increasing force on the pressure plate, until the ultimate and required effective force has been reached. A spring-finger diaphragm clutch so provided will operate smoothly and without a jerky translation of power from the flywheel to the transmission shaft.

While I have here shown a structure in which twelve of the eighteen spring-fingers are equipped with my improved devices, more or less of the shims can be used on the spring-fingers as may be desired, depending upon various conditions involved and I do not wish to be limited to the exact number of spring-fingers so employed.

In view of the above description it will be seen that the objects of the invention are achieved and other advantageous results attained, all as pointed out.

As many changes could be made in the above constructions without departing from the scope of the invention, it is intended that all the matter contained in the above description or shown in the drawings shall be interpreted as illustrative only and not in a limiting sense.

I claim:

1. A manually-operable clutch unit for mounting upon an internal combustion engine, the said unit including an engine drive shaft, a fly-wheel on the drive shaft, a housing anchored on one side of the fly-wheel, a clutch assembly mounted within the housing and including a driven clutch plate on the drive shaft next to the fly-wheel, an annular pressure plate on the drive shaft outwardly of the clutch plate, a circumferentially grooved clutch bearing ring slidably mounted on the drive shaft outwardly of the pressure plate, and a circular multi-spring fingered, invertable diaphram plate with flanged periphery and thereby secured to the periphery of said annular pressure plate, and being loosely, pivotally and invertably supported in place by pivot rivets passed through the outer face of the unit housing adjacent its outer margin and through slots in the aligned margin of the spring fingered diaphram plate, the said fingers being spaced apart circumferentially by slots extended radially from the marginal slots of the diaphragm plate, and the inner ends of the spring fingers of the diaphram plate being seated loosely within the circumferential groove of the clutch bearing ring, and shims mounted in circumferential spaced relation upon the inner ends of certain selected and spaced groups of the spring fingers by means of the inner ends of the shims being hooked over and under the inner ends of the fingers and arranged to loosely ride within the groove of the clutch bearing ring, whereby by virtue of the thickness of the hooked inner ends of the shims the spring fingers of the diaphram plate thus equipped with shims are the first to function in the operation of closing the clutch for transmitting power to the drive shaft, and are the last to release their clutching action in the operation of opening the clutch to neutral position, and releasing the drive shaft.

2. In a manually operable clutch unit for internal combustion engines as defined in claim 1, the said shims being formed of flat metal and with a pair of spaced and downwardly turned hooks at one end adapted to engage the inner ends of adjacent spring fingers of the said spring fingered diaphram plate, and adapted to seat loosely within the groove of the clutch bearing ring.

3. In a manually operable clutch unit for internal combustion engines as defined in claim 1, the said shims being made of flat metal and formed at one end with spaced and downwardly turned hooks adapted to engage the inner ends of adjacent spring fingers of the diaphram plate and to seat freely within the groove of the clutch bearing ring, and being formed at the opposite end with similarly spaced and upturned hooks adapted to engage an annular ring for supporting the shims operatively in place, and an annular ring seated within the said upturned hooks.

4. In a manually-operable clutch unit as defined in claim 3, said shims having a down-turned hook of inverted T-shape form depended from them between the up-turned hooks at the one end thereof, as means for operatively holding the shims in place on the diaphram plate.

HOMER PORTER.

REFERENCES CITED

The following references are of record in the file of this patent:

UNITED STATES PATENTS

| Number | Name | Date |
|---|---|---|
| 1,999,510 | Meyer | Apr. 30, 1935 |
| 2,183,001 | Wolfram | Dec. 12, 1939 |
| 2,256,708 | Geyer et al. | Sept. 23, 1941 |
| 2,356,310 | Gass | Aug. 22, 1944 |
| 2,579,179 | Edens | Dec. 18, 1951 |